United States Patent
Harder

(10) Patent No.: US 12,280,951 B2
(45) Date of Patent: Apr. 22, 2025

(54) WAREHOUSE MANAGEMENT SYSTEM, ORDER PICKING AND WAREHOUSE SYSTEM AND ORDER PICKING METHOD WITH EYECATCHING TRANSMITTERS WHOSE COLORS ARE CHANGEABLE IN AN AUTOMATIC MANNER

(71) Applicant: Kardex Produktion Deutschland GmbH, Neuburg/Kammel (DE)

(72) Inventor: Emmanuel Harder, St. Leon-Rot (DE)

(73) Assignee: KARDEX PRODUKTION DEUTSCHLAND GMBH, Neuburg/Kammel (DE)

( * ) Notice: Subject to any disclaimer, the term of this patent is extended or adjusted under 35 U.S.C. 154(b) by 920 days.

(21) Appl. No.: 17/430,336

(22) PCT Filed: Feb. 13, 2020

(86) PCT No.: PCT/EP2020/053784
§ 371 (c)(1),
(2) Date: Aug. 12, 2021

(87) PCT Pub. No.: WO2020/165358
PCT Pub. Date: Aug. 20, 2020

(65) Prior Publication Data
US 2022/0144545 A1    May 12, 2022

(30) Foreign Application Priority Data
Feb. 15, 2019   (DE) ............... 10 2019 202 096.8

(51) Int. Cl.
*B65G 1/137* (2006.01)
*H04B 10/116* (2013.01)
*H04W 4/021* (2018.01)

(52) U.S. Cl.
CPC ......... *B65G 1/1373* (2013.01); *H04B 10/116* (2013.01); *H04W 4/021* (2013.01); *B65G 2203/04* (2013.01)

(58) Field of Classification Search
CPC ............. B65G 1/1373; B65G 2203/04; B65G 2203/0283; B65G 1/1375; H04B 10/116; H04W 4/021
See application file for complete search history.

(56) References Cited

U.S. PATENT DOCUMENTS 6,668,253 B1 * 12/2003 Thompson ............. G06Q 10/06
11,117,255 B2 * 9/2021 Skaaksrud ............. G05D 1/225
(Continued)

FOREIGN PATENT DOCUMENTS

CN    1371073 A    9/2002
CN    104386405 A   3/2015
(Continued)

OTHER PUBLICATIONS

Notification of First Office Action and Search Report for Chinese Patent Application No. 2020800289424 dated Aug. 29, 2022 with English translation, 20 pages.
(Continued)

*Primary Examiner* — Michael Collins
(74) *Attorney, Agent, or Firm* — Edell, Shapiro & Finnan, LLC

(57) ABSTRACT

A warehouse management system is provided for controlling a picking operation with at least one order picking trolley for storing items of a set of picking orders, at least one storage unit with storage areas for storing the items, and with at least one access station for accessing the items by an order picker. The order picking trolley and the access station are each provided with an eye-catching transmitter and at least one of the eye-catching transmitters has a display area (37, 55) with
(Continued)

a remotely switchable color. The warehouse management system is configured to automatically switch the color of the at least one remotely switchable eye-catching transmitter to the color of the other eye-catching transmitter when it has been detected that the item is positioned ready for access.

20 Claims, 3 Drawing Sheets

(56) References Cited

U.S. PATENT DOCUMENTS

| | | | | |
|---|---|---|---|---|
| 11,783,657 | B2* | 10/2023 | Skaaksrud | G05D 1/027 |
| | | | | 701/23 |
| 2004/0083144 | A1* | 4/2004 | Venema | G06Q 10/087 |
| | | | | 705/28 |
| 2006/0206235 | A1 | 9/2006 | Shakes et al. | |
| 2010/0121480 | A1* | 5/2010 | Stelzer | G06Q 10/087 |
| | | | | 700/229 |
| 2016/0229631 | A1* | 8/2016 | Kimura | B65G 1/1378 |
| 2017/0258431 | A1* | 9/2017 | Klingenbeck | A61B 6/481 |
| 2018/0059635 | A1* | 3/2018 | Johnson | G06K 7/1417 |
| 2019/0286138 | A1* | 9/2019 | Skaaksrud | G05D 1/226 |

FOREIGN PATENT DOCUMENTS

| | | |
|---|---|---|
| CN | 105517922 A | 4/2016 |
| CN | 107226313 A | 10/2017 |
| CN | 206599161 U | 10/2017 |
| CN | 109086757 A | 12/2018 |
| EP | 2876059 A1 | 5/2015 |
| JP | 86155007 A | 3/1986 |
| JP | H04-55201 A | 2/1992 |
| JP | 2003321111 A | 11/2003 |
| JP | 2009263018 A | 11/2009 |
| JP | 2013028454 A | 2/2013 |

OTHER PUBLICATIONS

International Search Report for International Application No. PCT/EP2020/053784 dated May 19, 2020, 5 pages.

Office Action for German Patent Application No. 102019202096.8 dated Feb. 11, 2021, with English translation, 12 pages.

First Examination Report for European Patent Application No. EP20705666.4 dated Mar. 28, 2024 with English translation, 12 pages.

* cited by examiner

WAREHOUSE MANAGEMENT SYSTEM, ORDER PICKING AND WAREHOUSE SYSTEM AND ORDER PICKING METHOD WITH EYECATCHING TRANSMITTERS WHOSE COLORS ARE CHANGEABLE IN AN AUTOMATIC MANNER

The invention refers to a warehouse management system for controlling order picking, in particular paperless order picking, by means of at least one order picking trolley for storing items of a set of picking orders and by means of at least one storage unit with storage areas for storing the items and with at least one access station for access to the items by an order picker. The invention also refers to an order picking and warehouse system that is equipped with at least one warehouse management system of the aforementioned type. In addition, the invention refers to a picking method in which a set of picking orders comprising a plurality of items is assigned to an order picking trolley. Finally, the invention also refers to a computer program product or a computer readable storage medium.

In the following, order picking is understood to mean the storage of items from an order picking trolley into a storage unit and/or the removal of items from a storage unit into a picking trolley, in particular by an order picker. In order to make order picking efficient, it can be helpful to guide the order picker at least partially in their activity, so that they can quickly and easily locate a storage unit intended for access and/or an order picking trolley intended for access. The guidance through the warehouse management system should be intuitively understandable and as fatigue-free as possible for the order picker.

It is therefore the object of the invention to provide a warehouse management system, an order picking and warehouse system, an order picking method, and a computer program product, each of the foregoing type, with which such guidance is possible.

For the above-mentioned warehouse management system, the object according to the invention is solved in that the order picking trolley and the access station are each provided with an eye-catching transmitter and at least one of the eye-catching transmitters has a display area with a remotely switchable color, the warehouse management system being configured to automatically detect whether at least one item of the set is positioned in the access station ready for access by the order picker and to automatically switch the color of the at least one remotely switchable eye-catching transmitter to the color of the other eye-catching transmitter when it has been detected that the item is positioned ready for access within a predetermined time.

For the order picking and warehouse system mentioned above, the object according to the invention is solved in that the order picking and warehouse system comprises at least one order picking trolley which is provided with an eye-catching transmitter with a colored display area, and wherein the order picking and warehouse system comprises at least one storage unit which is provided with a further eye-catching transmitter with a colored display area. At least one of the display areas has a color that can be switched over remotely controlled by the warehouse management system.

For the order picking method mentioned above, the object according to the invention is solved in that in the method it is automatically determined that at least one item of the set is ready for access by an order picker at at least one access station of at least one storage unit, the order picking trolley and the access station each having an eye-catching transmitter with a colored display area and the color of at least one display area being switchable under remote control, the color of the at least one display area switchable under remote control being automatically switched over to the color of the other display area after the determination of the readiness for access.

For the computer program product or the computer-readable storage medium mentioned above, the object according to the invention is solved in that the computer program product or the computer-readable storage medium comprises instructions, in particular a computer program with instructions which, when the program or the instructions are executed by a computer, leave the latter to execute the method according to the invention or the steps of this method.

The solution according to the invention makes it possible to match the colors of the two eye-catching transmitters. In other words, the eye-catching transmitters of the order picking trolley shows the same color as the eye-catching transmitter of the access station. This makes it easy for an order picker to relate an access station, where an item of a set is to be picked up or stored, to the picking trolley intended for this set or a picking order of the set and to execute an access accordingly.

Access means feeding an item from the order picking trolley to the storage unit at the access station or removing it from the storage unit at the access station and feeding it to the order picking trolley. The fact that the warehouse management system is configured to switch the color of at least one of the two eye-catching transmitters by remote control means that it is possible to react flexibly to a particular situation, in particular to changes. The predetermined time within which an item is positioned ready for access is to be understood as a maximum time within which an item is ready for access. If an item is on its way to an access station, the imminent arrival of the item at the access station can already be signaled by switching the color of an eye-catching transmitter.

If, on the other hand, a time period of 0 seconds is selected as the predetermined time, the color can only be switched at the moment when the item is actually positioned ready for access. It is advisable to select a time of between 5 and 10 seconds as the predefined time.

The solution according to the invention can be further improved by various embodiments, each of which is advantageous in itself and can be combined with one another as desired. These embodiments and the advantages associated with them are discussed below.

The color can also be changed, for example, at a time when a previous item that was ready for access has already been stored or removed. Alternatively, the color can also be switched as soon as an item intended for access is moved to the access station. The warehouse management system can, for example, use the known item position, known speeds and/or known distances within a storage unit to calculate a remaining time that is needed for an item to arrive at the access station. Falling below a predetermined threshold of the remaining time can be used as a trigger to switch the color.

The set or its picking orders can be predetermined. In other words, a fixed list of items to be picked may exist, for example based on a customers item order. Alternatively, the warehouse management system may dynamically modify a picking order. The set of picking orders may also be predetermined, in particular by the warehouse management system. Preferably, a set is assigned to exactly one order picking trolley.

The order picking trolley represents an item collection area for items. Such an order picking trolley is often also called a "pick cart".

The storage unit can be a static rack, an automatic warehouse system with conveyor, for example a storage lift, a storage rack with aisle conveyor or a paternoster. Other means for storing and/or providing items can also form a storage unit.

The at least one eye-catching transmitter of the access station is preferably attached to the storage unit and arranged so as to be visible from outside the storage unit. Preferably, the at least one access station is provided with an eye-catching transmitter that can be switched over by remote control. A storage unit may have multiple spatially separated access stations. Preferably, each access station is assigned a remotely switchable eye-catching transmitter. For example, a remotely switchable eye-catching transmitter can be arranged at each access station. An access station can, for example, be a storage and/or removal station.

As an alternative to a storage unit with one or more access stations, the entire storage unit can also be an access station, for example in the case of a rack.

A storage unit may be ready for access when the at least one item is ready in an access station of the storage unit. Alternatively or additionally, the storage unit may be ready for access when the at least one item arrives at the access station within a predetermined transport time and/or is a predetermined transport distance away from the access station. This may be the case, in particular, with a storage unit having a conveyor configured to transport items between the storage areas and at least one access station.

The warehouse management system can comprise a representation, in particular a virtual or digital representation, of the items and their position within the set stored or to be stored in a storage unit. The warehouse management system may be configured to detect readiness for access based on such a representation of the position of the items. In other words, the warehouse management system may be configured to follow the items, i.e. to "track" the items.

The warehouse management system may comprise hardware, for example a computer with at least one CPU (Central Processing Unit) or a plurality of interconnected computers. Alternatively, the warehouse management system may comprise software, in particular a computer program product. Likewise, the warehouse management system may comprise a combination of hardware and software.

The display area of an eye-catching transmitter can, for example, have at least one color-variable illuminant. Alternatively or additionally, the display area can also be formed by a suitable display device, for example a display, which can show different colors. LCD, TFT and OLED displays may be mentioned merely by way of example. Likewise, different colored light-emitting diodes (LEDs) or RGB LEDs can be used, which can be controlled to light up in different colors.

The display area can be configured to display additional information. For example, the display area of an eye-catching transmitter on the order picking trolley can display an identification representing the order picking trolley, such as a number. Preferably, the eye-catching transmitter, at least the one on the order picking trolley, is formed by an eye-catching light that is mounted on the order picking trolley so as to be visible from as far away as possible. When the following text refers to the color of the eye-catching transmitter, it means the color of the display area of the respective eye-catching transmitter, or the color represented by the display area.

The set of picking orders comprises at least one picking order. In particular in the case that individual picking orders concern only a small quantity of items or only small items, a set preferably contains several picking orders. In this case, a set preferably contains so many picking orders that the items belonging to the picking orders can be accommodated in an order picking trolley.

To accommodate items, an order picking trolley preferably has a plurality of storage goods containers, so-called "handling units". Such a handling unit can, for example, be formed by a compartment in an order picking trolley. During picking, a handling unit is assigned to one picking order at a time, preferably to exactly one picking order. If the number of items in a picking order exceeds the capacity of a handling unit, a picking order can also comprise a plurality of handling units.

The access station is equipped with an eye-catching transmitter. This means that the eye-catching transmitter is visually assigned to the access station, for example, it is located closer to this access station than to another access station. The eye-catching transmitter does not necessarily have to be attached to or in the access station. Preferably, it is mounted on the storage unit, for example on a housing of the storage unit, in the vicinity of the access station. The eye-catching transmitter is preferably attached to a storage unit so that it can be seen from a distance.

As already described above, the warehouse management system according to the invention can be used to create a color link between an order picking trolley and an access station ready for access, which is immediately recognizable to the order picker. In addition, the warehouse management system can also be configured to generate a color link between a handling unit of the order picking trolley and the order picking trolley and/or the access station. For example, at least one handling unit of an order picking trolley can also be provided with a display device with remotely switchable color.

Using the same color on the eye-catching transmitters of the access station and the order picking trolley, an order picker can first assign an order picking trolley to an access station. By means of a corresponding indicator on a handling unit, the handling unit can then also be assigned to the access station. The assignment of an item to a color-marked handling unit is referred to as pick-by-color when removing items from a storage unit and as put-by-color when placing items into a storage unit.

The term "color" in the sense of the teaching of the present invention can also include a white, black, colorless or switched-off, i.e. a non-illuminated, display area. Furthermore, colors may also be understood to mean different color patterns that change in time and/or space.

The warehouse management system can be further improved in that it is configured to automatically switch the display areas of the eye-catching transmitters of those access stations that are determined to be ready for access to items of the set of an order picking trolley to the color of the display area of the eye-catching transmitter of this order picking trolley in the case of a plurality of access stations, each of which is provided with a remotely switchable eye-catching transmitter. In this way, all access stations ready for access can be highlighted in color so that the order picker can approach and access them with his order picking trolley.

If the eye-catching transmitters of a plurality of access stations display the same color, the order picker can decide for themselves which of these access stations they will approach first when processing their set or picking order.

This choice increases the order picker's personal responsibility. As a result, picking can be less fatiguing for the order picker. In other words, freedom from fatigue may be improved. In the long run, this may increase picking efficiency, even though an order picker may not always choose the shortest path to complete their set or picking order. To assist the order picker in their choice, at least one access station can be provided with a remaining time indicator that indicates how long it takes to be ready for access, for example, how long it takes for items to arrive at the access station.

The warehouse management system can be configured to automatically switch the display areas of the eye-catching transmitters of those access stations that are determined to be ready for the access of the set of an order picking trolley to the color of the display area of this order picking trolley in the case of a plurality of order picking trolleys that each have an eye-catching transmitter with a display area of different color and in the case of a plurality of access stations that are each provided with an eye-catching transmitter that can be switched over by remote control. This makes it possible to use a plurality of order picking trolleys together with a plurality of access stations. In this case, the access stations available for access for one order picking trolley and the order picking trolley can be marked by one color and the access stations available for access for at least one further order picking trolley and the at least one further order picking trolley can be marked by another color. As the risk of confusion is low due to the access stations and order picking trolleys being easily distinguishable intuitively by means of the different colors, a large number of order picking trolleys and/or access stations can be used simultaneously to process a large number of sets or picking orders.

In order to indicate in an easily recognizable manner that all items intended for access have been removed from an access station, the warehouse management system can be configured to automatically switch the color of the eye-catching transmitter of this access station after all items of a set provided for access have been accessed from the access station. For this purpose, it is advantageous if the warehouse management system is configured to automatically detect the access, i.e. the removal or storage of stored goods, to all items of the set that have been made available. The removal of all items can be detected, for example, by acknowledgement of an order picker or automatically by monitoring the access station, for example by means of a camera. The color of the eye-catching transmitter of the access station can then be set, for example, to a neutral value or to a color of the display area of an eye-catching transmitter of another order picking trolley whose items will be provided next in the access station.

The order picking of items can be made more efficient by configuring the warehouse system to automatically control one or a plurality of storage units in such a way that individual items of a set are made available in more than one access station at the same time. An order picker can then move to and access the multiple access stations simultaneously or sequentially.

Switching a color of the eye-catching transmitter of an order picking trolley to a color of an access station provided for access can be facilitated by the warehouse management system being configured to determine the position of the at least one order picking trolley and/or the eye-catching transmitter of the at least one order picking trolley. Position detection means, for example known tracking systems, can be used for this purpose.

The warehouse management system is preferably configured to control one or a plurality of storage units in a predetermined zone around a determined position of an order picking trolley so that individual items of the set of that order picking trolley are provided at more than one access station of the zone simultaneously. Such an embodiment may be used to provide items to an order picking trolley as that order picking trolley approaches the access stations. According to a further improvement, the warehouse management system may be configured to, when the positions of a plurality of order picking trolleys determined by the warehouse management system are in a predetermined zone, control the storage units of that zone so that individual items from each of the sets of those order picking trolleys are provided simultaneously in different access stations.

The warehouse management system can be configured to switch the color of a display area of an eye-catching transmitter depending on the location. This can mean an eye-catching transmitter of an order picking trolley and/or an access station. In addition, the color of an information transmitter that can be worn by an order picker can also be switched depending on the location.

According to a further improvement of the warehouse management system, it can be configured to automatically switch the display areas of the eye-catching transmitters of a plurality of order picking trolleys to different colors respectively. In particular, the warehouse management system can be configured to automatically switch the display areas of the eye-catching transmitters of a plurality of such order picking trolleys to different colors respectively, which are located within a predetermined, preferably dynamically configurable, order picking zone. In this way, collisions can be avoided. In other words, the same colors can be prevented from being accidentally used for different sets. Such prevention of collisions can take place in particular in a predetermined picking zone. Within a picking zone, the number of colors assigned is kept as low as possible. With a small number of colors, it may be easier to select colors that are as easy to distinguish as possible.

The warehouse management system is preferably configured to determine the at least one picking zone by means of geofencing. Virtual areas can be determined and delimited from one another by geofencing.

Several picking zones arranged one behind the other can form a picking path. Such a picking path can be determined by the time sequence of those picking zones in which the items of the set are provided for access at the same time. A picking zone may be a spatial area comprising a plurality of access stations allowing simultaneous access to items of a set. Thus, an order picker can sequentially process multiple picking zones by pushing the order picking trolley into each picking zone. Preferably, each picking zone comprises at least one storage unit or at least a plurality of storage units.

Along the picking path can be arranged the storage units containing the items of the set. A size of the picking zone can be determined according to ergonomic aspects. For example, according to the fact that display areas of eye-catching transmitters can be recognized and/or that storage units can be reached with an order picking trolley. The size of a picking zone can also be determined according to how many order picking trolleys are to be arranged in it at the same time. Preferably, an order picking zone has a length of less than 50 meters, and more preferably a length of less than 25 meters. Picking zones that follow one another along a picking path may overlap. Preferably, however, two successive picking zones do not overlap.

The warehouse management system can be configured to automatically set the same color on a display area with remotely switchable color of an information transmitter that can be worn on the body of the order picker and on a display area of an eye-catching transmitter of an order picking trolley depending on an assignment of the order picker to an order picking trolley. This allows an order picker to easily locate the order picking trolley assigned to him. The order picker is usually assigned a set of order picking orders. Since a set of picking orders is assigned to an order picking trolley, an order picking trolley is automatically assigned to an order picker. In order to set the same color at the display area of the information transmitter and at the display area of the eye-catching transmitter of the order picking trolley, at least one of the two display areas is color changeable. To ensure a high flexibility of the warehouse management system, preferably both display areas are color changeable.

According to a further advantageous embodiment, the warehouse management system can be configured to automatically set the same color at the information transmitter of the order picker and at a display area of an eye-catching transmitter of an order picking trolley, depending on an assignment of an order picker to an order picking trolley in each case, for a plurality of order pickers each with an information transmitter and a plurality of order picking trolleys each with an eye-catching transmitter. This allows each order picker to easily find the order picking trolley assigned to him. Confusion can thus be avoided.

To further improve the warehouse management system, it can be configured to automatically determine the position of an information transmitter worn on the body of an order picker, in particular relative to an access station and/or to an order picking trolley, and to change the color of the display area of the information transmitter depending on the position. Depending on the position of the order picker, a specific picking order can thus be assigned to the order picker.

The information transmitter preferably has at least one position transmitter so that the warehouse management system can detect the position of the information transmitter and thus the position of the order picker. Alternatively, the position transmitter may be formed separately from the information transmitter. For example, it may be a separate portable device or integrated into such a device. As a further alternative or additional means of determining the position of the order picker, at least one optical system may also be used. For example, the position may be determined thereby by at least one camera system with an automatic recognition of the order picker.

The warehouse management system is preferably configured to automatically match the color of the display area of an information transmitter to the color of an eye-catching transmitter of an access station when the information transmitter is in a predetermined position relative to the access station. This embodiment may make it possible to assign a picking order to an order picker when the order picker approaches an access station. This may be particularly advantageous in the case where an order picker who is already assigned to a picking order and is accessing an access station needs assistance.

Such a case can occur, for example, when a particularly large number of items, bulky items or heavy items have to be moved. In such a situation, a jam of order pickers and/or order picking trolleys may occur. Then, at least one further order picker may come to the aid of the first-mentioned order picker. In particular, at least one subsequent order picker may come to the aid of the first-mentioned order picker. The at least one further order picker can be originally assigned to another set or another picking order. If the at least one further order picker then approaches the access station of the first order picker, the set or the order picking order of the order picker can also be assigned to the at least one further order picker, at least temporarily. During this time, the then at least two order pickers are shown the same color at the display areas of their information transmitters. The at least two pickers can then work together to at least partially process the set or the picking order of the first picker. If no more help is required, the at least one other picker can leave the access station, and the color of the display area of his information transmitter can return to that of his original set or picking order. In this way, a jam can be quickly cleared.

To facilitate the position-dependent switching of the color of the display area of the information transmitter of an order picker described above, the warehouse management system is preferably configured to determine an access zone in front of an access station by means of geofencing and to automatically set the color of the display area of an information transmitter located within the access zone to the color of the display area of the eye-catching transmitter of the access station of this access zone. In other words, the color of the display area of the information transmitter is switched to the color of the eye-catching transmitter of the access station as soon as the order picker enters the access zone. A picking zone mentioned further above may include several access zones.

An access zone can also be determined in front of a large number of access stations by geofencing. Alternatively, exactly one access zone can be defined in front of each access station.

The warehouse management system can be configured to reset the color of the information transmitters display area, which is set to the color of the access station's eye-catching transmitter, to a previously set color when all of the items in the order picking trolley's set have been removed from the access station whose display area has the same color as the information transmitters display area before switching back.

In other words, an order picker who has temporarily processed a different set can, after switching back the color of the display area of his information transmitter, return to his original set and continue processing it.

Preferably, the warehouse management system is configured to receive a removal acknowledgement signal representative of the removal of all items of a set from an access station. The access station and/or the information transmitter may include an acknowledgement transmitter therefor. The acknowledgement transmitter may be, for example, mechanical, in particular a switch or a touch-sensitive element, for example a touch screen. Actuation of the acknowledgement transmitter may automatically generate the removal acknowledgement signal.

The warehouse management system can also be configured to receive a storage acknowledgement signal that is representative of the storage of items removed from an access station onto an order picking trolley. For this purpose, the order picking trolley and/or the information transmitter may include an acknowledgement transmitter, the actuation of which automatically generates the storage acknowledgement signal. According to an advantageous embodiment, the acknowledgement transmitter for the storage acknowledgement signal and the acknowledgement transmitter for the storage acknowledgement signal may be identical. In other words, the acknowledgement transmitter for the removal acknowledgement signal automatically becomes the acknowledgement transmitter for the storage acknowledgement signal when the removal is acknowledged and vice versa when the storage is acknowledged.

According to a further advantageous embodiment, the warehouse management system can be configured to output an optical signal to a wearable worn by an order picker, the signal being representative of a position of a handling unit, in particular assigned to an order picking job, on the order picking trolley, into which an item taken from an access station is to be stored, and/or of a number and/or type of items to be stored in the handling unit of the order picking trolley. In other words, the handling unit can indicate to the order picker in which handling unit of the order picking trolley items are to be stored. In addition, the number and/or type of items can be displayed.

The signal may be represented by a color or by the display of at least one character, for example at least one arrow. The information transmitter may be integrated into the wearable. Alternatively, the wearable may be a separate element. By way of example only, the information transmitter may be wearable on the wrist and the wearable may have a spectacle shape, whereby the order picker can then see the signal while wearing the spectacles. Such spectacles can be, for example, augmented reality glasses. Said wearable can visually identify the handling unit for a picking order of the set. Of course, said wearable can also be a device that can be worn on another part of the body. For example, on the wrist, on the upper arm, on the forearm or in the hand. The same also applies to the information transmitter.

The order picking and warehouse system according to the invention can be further improved by comprising a plurality of order picking trolleys each having an eye-catching display, in particular each having a display area that can be switched over by remote control in terms of color.

Preferably, the order picking and warehouse system according to the invention comprises a plurality of storage units each with an eye-catching transmitter, in particular with one eye-catching transmitter per access station. Preferably, each eye-catching transmitter is provided with a display area with a color that can be switched over remotely by the warehouse management system.

The order picking and warehouse system can comprise at least one information transmitter configured as a wearable, which has an area with remotely switchable color and is connected via the warehouse management system to the eye-catching transmitters of the at least one order picking trolley and the at least one storage unit in a data-transmitting manner.

Preferably, the order picking and warehouse system comprises a plurality of eye-catching transmitters for order picking trolleys, wherein the eye-catching transmitters are configured to be repeatedly attachable to different order picking trolleys without tools. Thus, an order picking trolley can be quickly and easily provided with an eye-catching light and equipped for the order picking and warehouse system.

Preferably, the order picking and warehouse system comprises an access zone determined by the warehouse management system by means of geofencing, accessible to an order picker for accessing the access station of a storage unit and arranged in front of the access station, and a position transmitter portable by the order picker for determining the position of the order picker relative to the access zone. Thus, the position of the order picker can be determined and, in particular, its presence in an access zone can be determined. In particular, an identification of the position transmitter and thus of the order picker can also be determined. The position transmitter can be part of a wearable or the information transmitter. However, it can also be formed by a separate means.

In the simplest case, the term "relative to the access zone" can mean a distinction between a position inside and a position outside the access zone. Alternatively or additionally, however, the exact position relative to the access zone can also be recorded. In this context, an exact position is to be understood as a sufficiently precise position. This can be, for example, with an accuracy of one meter, half a meter or even more accurate.

The position determination can be carried out by means of triangulation, for example. Preferably, the order picking and warehouse system has at least one position detection system based on electromagnetic waves and/or ultrasound for geofencing. The position detection system can comprise at least one position transmitter that can be worn by the order picker, in particular in the form of a wearable.

In the following, the invention is explained in more detail by means of examples of advantageous embodiments with reference to the drawings. The combination of features shown by way of example in the embodiment can be supplemented by further features for a particular application in accordance with the above explanations. Individual features can also be omitted from the embodiments described, also in accordance with the above explanations, if the effect of this feature is not important in a particular application.

In the drawings, the same reference numerals are always used for elements with the same function and/or the same structure.

Figure 1:
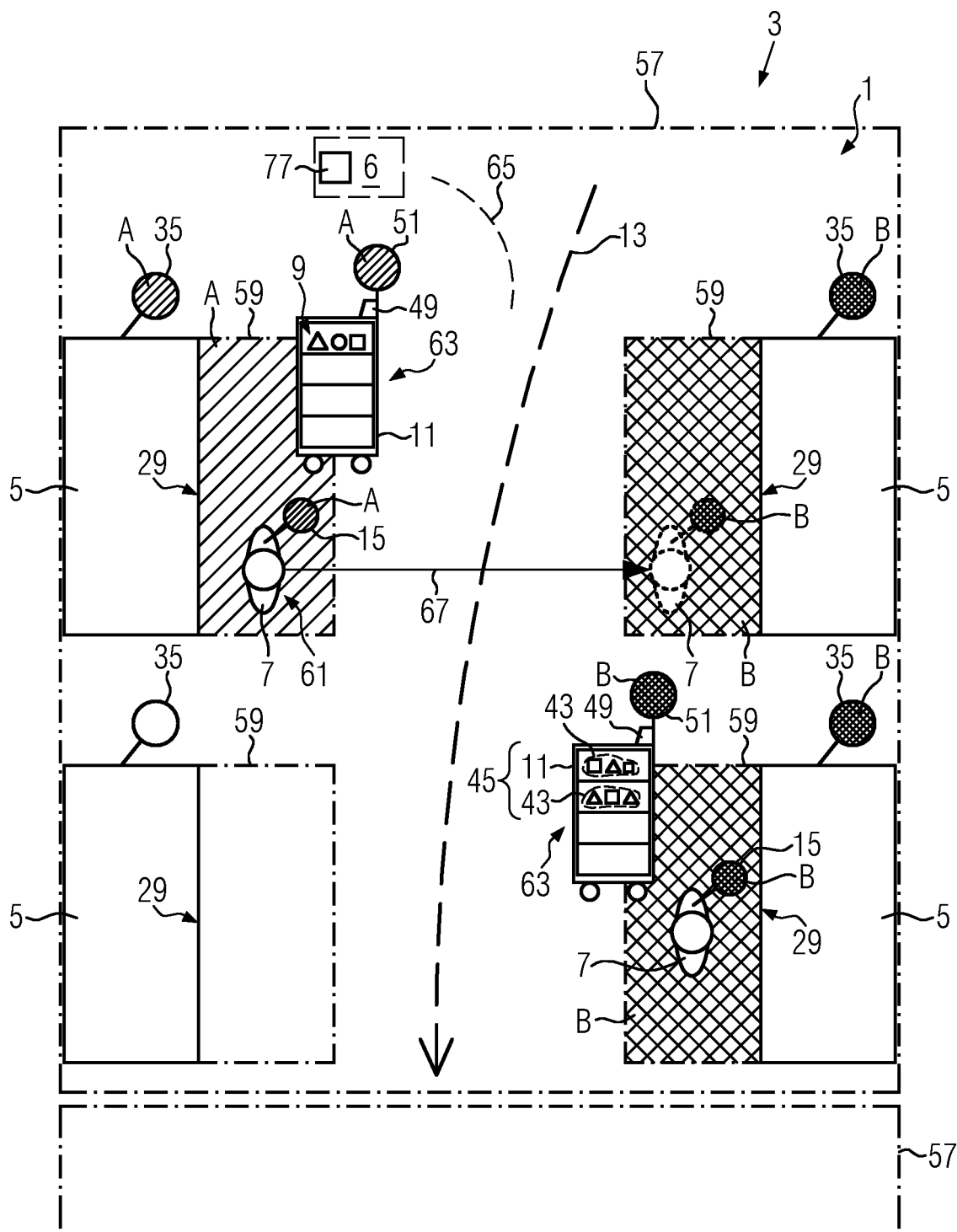
FIG. 1 shows an advantageous embodiment of a warehouse with an order picking and warehouse system according to the invention.

In the following, an advantageous embodiment of an order picking and warehouse system 1 according to the invention is explained in more detail with reference to FIG. 1.

The order picking and warehouse system 1 can be used in particular for a warehouse 3 comprising at least one storage unit 5. The order picking and warehouse system 1 preferably comprises at least one warehouse management system 6, which is configured for monitoring and/or controlling at least a part of the order picking and warehouse system 1. The warehouse management system 6 is preferably connected to the components to be monitored and/or controlled, in particular connected in a data-transmitting manner. The warehouse management system may in particular comprise one or a plurality of computers and/or software, in particular linked with each other.

The warehouse management system 6 is preferably provided with a computer program product 77 that includes instructions by which the warehouse management system 6 is at least partially controllable.

The storage units 5 can be, for example, warehouse systems such as storage lifts, racks, paternoster warehouse systems, carousel warehouse systems or other units. An access point of a transport track or a transport path can also be considered a storage unit 5. The only prerequisite is that an operator 7, i.e. an order picker 7, can remove items 9 from or transfer items 9 to a storage unit 5. In the field of warehouse logistics, this is often referred to as the loading and/or removal of stored goods. An operator 7 is also frequently referred to as a "picker" 7. Items 9 are often referred to as "stored goods". The loading and/or removal of items 9 into or out of a storage unit 5 is referred to below as "access".

A picking order 43 can be assigned to an order picker 7. A picking order usually contains a listing of items 9. These items 9 are to be removed from one or more storage units 5, i.e., to be "picked" and collected in a collection container, a so-called order picking trolley 11. Conversely, it is equally possible for a picking order 43 to contain a listing of items 9 that are to be transferred, in particular from an order picking trolley 11 to one or more storage units 5.

A picking order 43 usually contains, in addition to an indication of the item type, an indication of the number of items 9 to be stored and/or removed. One or a plurality of picking orders 43 can be combined in a set 45.

An order picker 7 may process a set 45 or a picking order 43 by going to one or a plurality of storage units 5 and accessing the access stations 29 of these storage units 5. If the order picker 7 must thereby go to a plurality of storage units 5, the movement of the order picker 7 within the warehouse 3 may result in a picking path 13.

To facilitate order picking, an order picker 7 can be guided by technical aids when processing a set 45 or a picking order 43. The order picking and warehouse system 1 uses color marking to visually guide the order picker 7. Color marking is advantageous because it can be intuitively understood compared to text or numbers.

For example, a color can be assigned to each set 45. Alternatively, a color can also be assigned to a picking order 43. Preferably, however, colors are to be assigned to sets 45. Thus, different colors may identify different sets 45. The color identifying a set 45 may be displayed at various locations in the warehouse 3 to assist an order picker 7 in picking.

The color associated with a set 45 can be displayed, in particular, at eye-catching transmitters 35, 51. An eye-catching transmitter 35, 51 is preferably a light source visible from a distance, the light source preferably being self-luminous. Alternatively, an eye-catching transmitter may be a passive light source, i.e. a light source stimulated to glow by an active light source. However, the color associated with a set 45 may also be displayed by other devices, such as displays.

Figure 2:
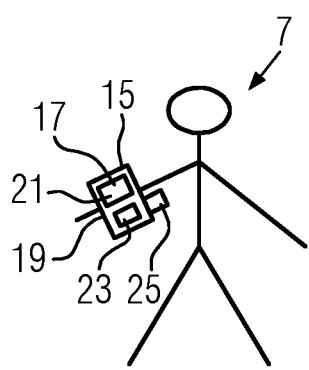
FIG. 2 shows an order picker with a portable information transmitter.
Figure 3:
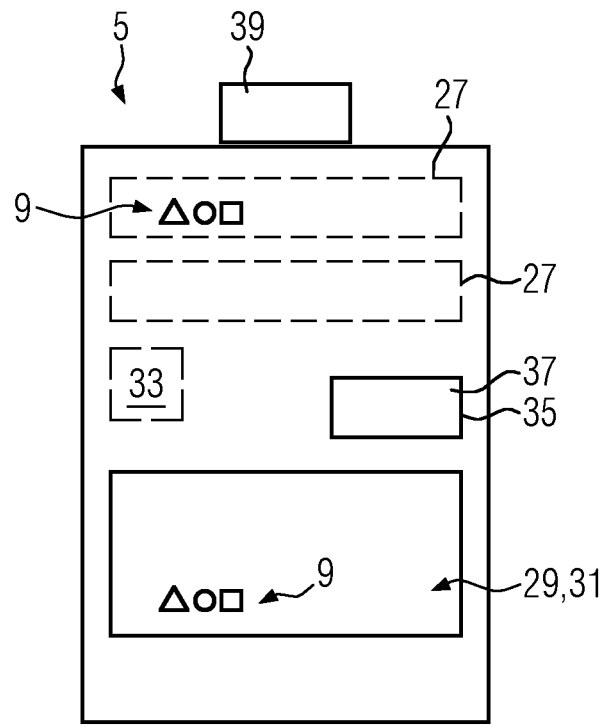
FIG. 3 shows a storage unit with an access station.
Figure 4:
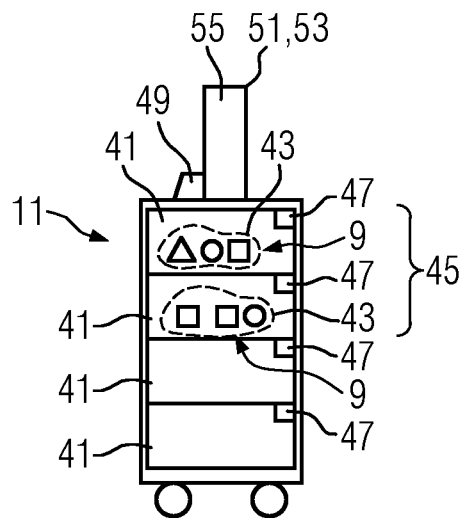
FIG. 4 shows an order picking trolley.

A storage unit 5, an order picking trolley 11 and an order picker 7 with a portable information transmitter 15 are shown schematically in FIGS. 2 to 4. These are briefly discussed below.

The order picker 7 is equipped with at least one portable information transmitter 15. The portable information transmitter 15 has at least one display area 17 whose color can be switched remotely.

The information transmitter 15 is preferably integrated in a wearable 19, which is shown in FIG. 2 merely as an example of a device that can be worn on the arm. Preferably, the wearable 19 is also configured to output an optical signal 21 for the order picker 7. By way of example only, the optical signal 21 is shown as part of the display area 17 of the information transmitter 15. In this case, the display area 17 may display the signal 21. Alternatively, the optical signal 21 may be displayed on another device, in particular a display device on the information transmitter 15. A further alternative is to provide a separate wearable 19, which is wearable separately from the information transmitter 15 and which is configured to output the optical signal 21. For example, the separate wearable (not shown) can have a spectacle shape.

The information transmitter 15 preferably also has at least one acknowledgement transmitter 23, at which the removal and/or placement of an item can be acknowledged. The acknowledgement transmitter 23 can be a mechanical switch, a touch-sensitive switch, for example as part of a touch display, or also a barcode reader or other input device. Likewise, it may be possible to make the display area 17 of the information transmitter 15 touch-sensitive, so that it can simultaneously be the acknowledgement transmitter 23. The acknowledgement transmitter 23 can also be formed on a separate device, in particular a device that can be worn on the body.

Preferably, the order picker 7 carries at least one position transmitter 25. The position transmitter 25 may be part of the information transmitter 15. Alternatively, it can also be formed separately from the information transmitter 15. Preferably, the position transmitter 25 can be worn on the body of the order picker 7.

The information transmitter 15, the acknowledgement transmitter 23 and/or the position transmitter 25 can be connected to the warehouse management system 6 in a data-transmitting manner, in particular in a wireless data-transmitting manner.

An example of a storage unit 5 is shown schematically in FIG. 3. The storage unit 5 can have a plurality of storage areas 27, which are only indicated by dashed lines in FIG. 3. Items 9 from the storage areas 7 can be moved to an access station 29, or moved from the access station 29 toward the storage areas 27. The access station 29 can in particular be a loading and/or removal station 31.

The storage unit 5, in particular a control device 33 of the storage unit 5, is preferably connected to the warehouse management system 6 in a data-transmitting manner.

The access station 29 is provided with an eye-catching transmitter 35. The eye-catching transmitter 35 is arranged in the vicinity of the access station 29 so that it can be visually assigned to the access station 29.

The eye-catching transmitter 35 has a display area 37 whose color can be switched over remotely by the warehouse management system 6. For this purpose, the eye-catching transmitter 35 can be connected directly to the warehouse management system 6 or indirectly via the control device 33 of the storage unit 5 in a data-transmitting manner.

The display area 37 may be a color changeable illuminant or a display, in particular a display, which is configured to display different colors.

The storage unit 5 may be provided with a position detection system 39, which is configured to detect the positions of position transmitters 25, 49. The position detection system 39 is only shown as an example on a storage unit 5. The position detection system 39 may be part of the order picking and warehouse system 1 independently of storage units 5 and may be arranged within the warehouse 3.

The position detection system 39 may comprise a plurality of transmitting and/or receiving devices adapted to detect at least one position transmitter 25, 49 and determine its position. For example, the position detection system 39 may use triangulation for this purpose. The position detection system 39 may be used to define zones within the order picking and warehouse system 1 and/or the warehouse 3 by means of geofencing. In particular, picking zones and access zones can be defined. This will be discussed later.

FIG. 4 schematically shows an order picking trolley 11. The order picking trolley 11 is used to collect and transport items 9. For this purpose, the order picking trolley 11 has storage goods containers, so-called handling units 41. In FIG. 4, the handling units 41 are shown as compartments in the order picking trolley 11 by way of example only.

Preferably, a handling unit 41 is assigned to exactly one picking order 43. The picking order 43 is only shown schematically as a set of items 9 in FIG. 4. Alternatively, a picking order 43 may extend over several handling units 41 if the capacity of one handling unit 41 is not sufficient for one picking order 43.

Several, different picking orders 43 may be combined into a set 45 of picking orders 43. Preferably, an order picking trolley 11 is assigned to exactly one set 45. The two different picking orders 43 are indicated in FIG. 4 by the different items 9 contained in them. Each of the handling units 41 may be provided with a display device 47 which can indicate to the order picker 7 in which handling unit 41 items 9 are to be stored, or from which handling unit 41 items 9 are to be removed. The display devices 47 may preferably represent a color and/or characters.

The order picking trolley 11 is preferably provided with a position transmitter 49, by means of which the position of the order picking trolley 11 within the warehouse 3 can be determined. By means of the position transmitter 49, an identification of the picking trolley 11 can preferably also be communicated to the warehouse management system 6. The position transmitter 49 can preferably be detected by the position detection system 39.

The order picking trolley 11 is provided with an eye-catching transmitter 51, which is formed in particular by an eye-catching lamp 53 that can be attached repeatedly and without tools. The eye-catching transmitter 51 has a display area 55 whose color can be switched over remotely. In particular, the color can be switched remotely by the warehouse management system 6. For this purpose, the eye-catching transmitter 51 is connected to the warehouse management system 6 in a data-transmitting manner. In particular, this can be done wirelessly.

The eye-catching transmitter 51, in particular its display area 55, is preferably visible from each side of the order picking trolley 11. This enables the order picker 7 to quickly locate or recognize an order picking trolley 11 assigned to him.

The eye-catching transmitter 51 preferably has a reading device for an identification means of the order picking trolley 11. The eye-catching transmitter 51 can thereby read an identification of the order picking trolley 11 to which the eye-catching transmitter 51 is attached and forward it to the warehouse management system 6. As a result, the order picking trolley 11 and the eye-catching transmitter 51 may form a single unit for the warehouse management system 6. The reading device may be, for example, a bar code reader or a reader for reading RFID tags. Accordingly, the identification means on the picking trolley 11 may be formed by a bar code, RFID tag, or other suitable means.

The order picking trolley 11, in particular the eye-catching transmitter 51 of the order picking trolley 11 may be provided with at least one projection device (not shown) configured to generate a light image suitable to indicate a direction. For example, an arrow may be generated. In particular, the projection device may project downwards, i.e., onto a ground. Thus, depending on a communication with the warehouse management system 6, the direction to the next access station 29 ready for access may be indicated. This may be particularly useful in large warehouses, where long distances may have to be covered and an eye-catching transmitter 35 of the access station 29 may not be readily apparent from a distance. The order picking zone 57 may then be divided into various sections distributed over the area of the warehouse and interconnected by the picking path 13.

In the following, the use of a warehouse management system 6 according to the invention and an order picking and warehouse system 1 according to the invention is described on the basis of the warehouse 3 shown in FIG. 1, with reference being made here to the components of the order picking and warehouse system 1 described with reference to FIGS. 2 to 4.

The order picking path 13 already mentioned at the beginning can be determined by a chronological sequence of so-called order picking zones 57, in which items 9 of a set 45 are simultaneously made available for access. Such an order picking zone 57 is indicated by the dashed line in FIG. 1.

An access zone 59 is associated with each access station 29. Preferably, an access zone 59 is arranged in front of the access station 29 so that an order picker 7 located in the access zone 59 has access to the access station 29.

For the sake of clarity, storage units 5 are shown in FIG. 1, each storage unit 5 having exactly one access station 29. For example, the storage units 5 in FIG. 1 may be similar in structure to the storage unit 5 described with reference to FIG. 3. However, a storage unit 5 may also have multiple access stations 29 and/or access zones 59.

The access zones 59 may be virtual zones. In other words, they may be determined by geofencing, for example. For example, one or a plurality of position detection systems 39 can determine the access zones 59, in particular by connection with the warehouse management system 6.

Since preferably each order picker 7 is provided with a position transmitter 25, it can be detected whether an order picker 7 is inside or outside a certain access zone 59. This makes it possible to determine the position 61 of an order picker. Furthermore, it is also possible to determine the position 61 of an order picker 7 absolutely, i.e. without relation to a specific access station 59. Position detection systems 39, in particular those which use triangulation, can be configured for this purpose.

Since each order picking trolley 11 is preferably also provided with a position transmitter 49, the position 63 of an order picking trolley 11 can preferably also be determined. Here, too, it may be possible in the simplest case to detect only the presence or absence of an order picking trolley 11 within an access zone 59. In addition, however, it may also be possible to determine the position 63 within the warehouse 3.

According to the invention, it is provided that at least one of the eye-catching transmitters 35 or 51, i.e. at the access station 29 or at the order picking trolley 11, has a display area 37 or 55 with a switchable color. For the sake of simplicity, this is explained below using two different colors A and B. Of course, other colors can also be used or, especially in the case of a plurality of order pickers 7, more than two colors.

In FIG. 1, color A is indicated by a simple hatching and color B by crossed hatching. It is advantageous if the two colors A and B are clearly distinguishable from each other. For example, color pairs red and green or yellow and blue can be used for this purpose. Here it can also be an advantage if, when only two colors A and B are used, these two colors are complementary to each other. For example, the complementary colors blue and yellow, red and cyan, or green and magenta can be used as the colors A and B. This allows a very fast and clear differentiation of the two colors A and B by an order picker 7.

Preferably, both eye-catching transmitters 35 and 51 each have a display area 37 and 55 with automatically switchable color A, B. In addition, the order picker 7 also carries an information transmitter 15 with a display area 17 whose color can be switched over remotely by the warehouse management system 6.

In the order picking and warehouse system 1 of FIG. 1, as preferred embodiments, the eye-catching transmitters 35, the eye-catching transmitters 51 and the information transmitters 15 are each provided with display areas whose color can be switched automatically.

The eye-catching transmitters 35 and 51 as well as the information transmitters 15 are only indicated in FIG. 1 and filled with the hatching representing the respective color. For the sake of clarity, the access zones 59 are also filled with the hatching that corresponds to the color of the eye-catching transmitter 35 of the corresponding access station 29.

At the beginning of a pick, that is, when an order picker 7 is to process a set 45 or a picking order 43, or even at the beginning of a workday, an order picker 7 is assigned an order picking trolley 11.

In FIG. 1, an order picker 7 with an order picker trolley 11 is shown in the upper left corner, with both showing the color A. At the bottom right, an order picker 7 is shown with an associated order picking trolley 11, with the information transmitter 15 and the eye-catching transmitter 51 both showing the color B.

Thus, an order picker 7 can quickly and easily identify the order picking trolley 11 assigned to him when visually comparing his information transmitter 15, or its display area 17, with the display area 55 of the eye-catching transmitter 51 on his order picking trolley 11. He can then use the order picking trolley 11 to head for access stations 29 of the storage units 5 in order to access them. Various scenarios are conceivable here.

In a simple scenario, an item 9 is provided for a set 45 or picking order 43 at an access station 29 of a storage unit 5.

The eye-catching transmitter 35 of the corresponding access station can then indicate A or B by a color representing the set 45 or a picking order 43. The order picker 7 can match the displayed color A or B on the eye-catching transmitter 35 with the colors of his information transmitter 15 and/or the eye-catching transmitter 51 of his order picking trolley 11.

If the colors match, as is the case with color A at the top left of the image, the order picker 7 can access the access station 29 and remove item 9 from it and place it in a handling unit 41 of his order picking trolley 11. Likewise, the order picker 7 can remove item 9 from a handling unit 41 of his order picking trolley 11 and store it in the access station 29.

As already described above, each handling unit 41 can also be provided with a display device 47 for this purpose. Once access is complete, the order picker 7 can acknowledge this, for example, via an acknowledgement transmitter 23. He can then move to an access station 29 and continue processing his set 45 or picking order 43.

As an alternative to the procedure described above, it is also possible that the position 61 of the order picker 7 and/or the position 63 of the order picking trolley 11 is detected. For example, a virtual zone 65 around the order picking trolley 11 can be determined.

If the zone 65 overlaps with an access zone 59 or if one of the access stations 29 is within the zone 65 around the order picking trolley 11, this may cause the corresponding access station 29 to provide item 9 to the set 45 associated with the order picking trolley 11.

As soon as the item or items 9 are provided, the color of the eye-catching transmitter 35 is switched to the color of the eye catching transmitter 51 or vice versa. In other words, in this case, the storage units 5 react to the presence of the order picking trolley 11 and provide the corresponding item(s) 9 for this order picking trolley 11, or for its picking orders 43 or its set 45.

The invention also offers other advantages. For example, the assignment of an order picker 7 and/or an order picking trolley 11 to a particular set 45 or to a particular picking order 43 can be changed, at least temporarily. This can be indicated by a change of color on the eye-catching transmitter 51 and/or on the information transmitter 15.

To illustrate this, the following situation is indicated in FIG. 1:

The order picker 7 shown at the lower right of FIG. 1, which is assigned a set 45 or a picking order 43, accesses an access station 29. The information transmitter 15, the eye-catching transmitter 51 and the eye-catching transmitter 35 all display the color B, respectively.

The order picker 7 accesses the access station of the storage unit 5. At the same time, the storage unit 5 shown above the aforementioned storage unit 5 in FIG. 1 is also ready for access by this order picker 7. Consequently, the eye-catching transmitter 35 of this storage unit 5 also displays the color B.

Due to the size of the set 45 or picking order 43, the weight of the items 9, or the urgency of the set 45 or picking order 43, the order picker 7 needs assistance.

He can now ask the second order picker 7 shown in FIG. 1 to help him. Alternatively, the second order picker 7, to whom color A is assigned, can also recognize that order picker 7, to whom color B is assigned, needs help. Of course, it is also possible that this is detected by the warehouse management system 6 and communicated to the order picker 7 to whom color A is assigned.

The order picker 7, which is assigned the color A, can then move, at least temporarily, to the access zone 59, whose access station 29 is also marked with the color B by the eye-catching transmitter 35, but which is not accessed. This change of the order picker 7 from one access zone 59 to another access zone 59 is indicated by the arrow 67 in FIG. 1.

At the moment when the order picker 7, to which color A was previously assigned, enters the other access zone 59, this is detected by the warehouse management system 6, in particular via at least one position detection system 39, and the color in the display area 17 of its information transmitter 15 is switched from A to B. This is shown in FIG. 1 for the storage unit 5 at the top right by the dotted line. The order picker 7 is then also assigned, at least temporarily, to the set 45 or picking order 43 of the order picker provided with color B from the beginning.

In this way, both order pickers 7 can process the combination 45 marked with the color B or the picking order 43. Both order pickers 7 can also use the order picking trolley 11 marked with the color B.

Once the set 45 or picking order 43 marked with color B has been completely or sufficiently processed, the order picker 7 whose color has been switched can return to his originally served access station 29, with the color of his information transmitter 15 being switched back to color A as soon as he enters the access zone 59 to the access station 29 marked with color A. The order picker 7 can then return to his original access station 29. Now both order pickers 7 can again process their respective sets 45 or picking orders 43.

Thus, by means of the warehouse management system 6 according to the invention, order pickers 7, order picking trolleys 11 and access stations 29 can be flexibly assigned to specific sets 45 or picking orders 43 and/or to each other.

The information transmitter 15 and/or the wearable 19 can be configured to generate an acoustic signal. The acoustic signal can be triggered in particular by the warehouse management system 6. Instead of or in addition to an acoustic signal, a tactile signal, for example a vibration alarm, may also be generated. Such a signal can be triggered by the warehouse management system 6, for example, when a color change occurs at the display area 17 of the information transmitter 15.

This can be useful, for example, in the case described above in which an order picker 7 enters another access zone 59 and thus triggers a change in the color of the display area 17 of his information transmitter 15. A corresponding signal can also be generated when an order picking trolley 11 associated with the order picker 7 undergoes a color change, or the color of the display area 55 of the eye catching transmitter 51 of this order picking trolley 11 is switched. In this way, the order picker 7 can be intuitively informed that he should now process a different set 45 or a different picking order 43.

In the following, some optional improvements of the warehouse management system 6 and/or the order picking and warehouse system 1 are described. In particular, the warehouse management system 6 may be configured to prevent color collisions. In other words, it may be ensured that colors are not duplicated unless, as described above, an assignment is to be temporarily changed so that multiple order pickers 7 or even order picking trolleys 11 are additionally used to process a set 45 or picking order 43 that is already in process. Preventing color collisions is particularly advantageous within a picking zone 57. For example, if there are several picking zones 57 in a warehouse, the same colors can be used in different picking zones 57.

The eye-catching transmitters 51 of the order picking trolley 11 are preferably configured in such a way that the color can be detected as soon as a view of the order picking trolley 11 is possible. The orientation of the order picking trolley 11 should preferably not play a role here. This is different from the optional display devices 47 of the handling units 41, which can generally only be detected visually if the order picker 7 is positioned in the vicinity of the handling units 41 on the one hand and the handling units 41 with their display devices 47 are oriented towards the order picker 7 on the other hand.

The warehouse management system 6 is preferably connected at least via data transmission, in particular wirelessly, to all eye-catching transmitters 35, 51 and information transmitters 15. In addition, it is also preferably connected directly or indirectly to the position transmitters 25 and 49 and/or to one or more position detection systems 39. Finally, the warehouse management system 6 is also preferably connected in a data-transmitting manner to the acknowledgement transmitters 23 and the control devices 33 of the storage units 5.

Figure 5:
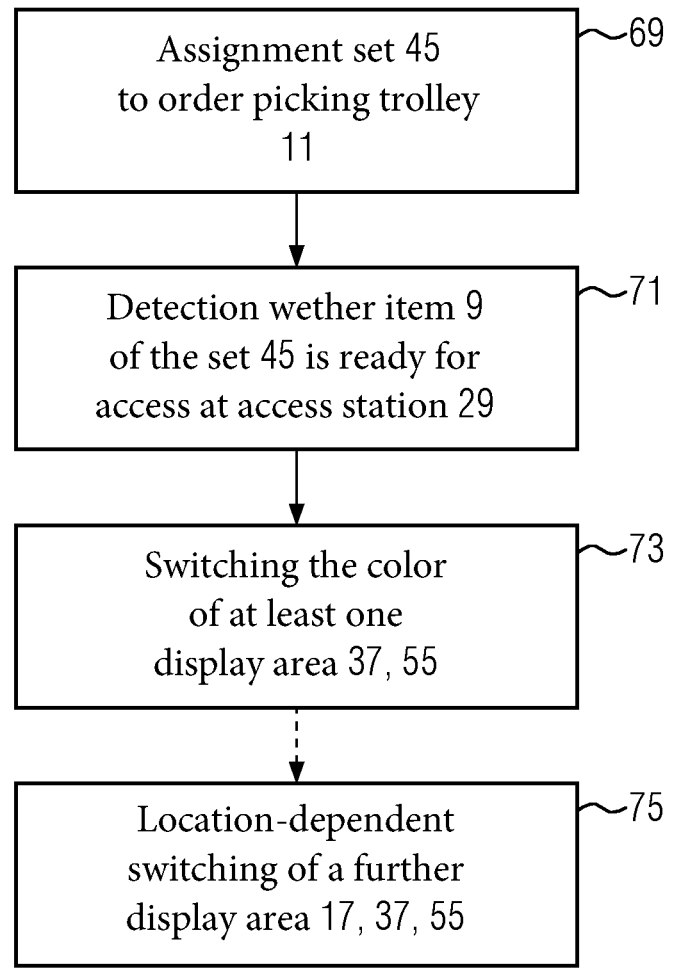
FIG. 5 shows the steps of a method according to the invention.

The following describes an order picking method according to the invention with reference to the block diagram in FIG. 5.

In a first method step 69, an order picking trolley 11 is assigned a set 45 of picking orders 43 including a plurality of items 9.

In a further method step 71, the warehouse management system 6 determines whether at least one item 9 of the set 45 is ready for access at an access station 29.

If this is the case, the method step 73 is executed, whereby the color A, B of at least one display area 37 and/or 55 is switched. This can ensure that the eye-catching transmitter 35 of the control device 33 and the eye-catching transmitter 51 of the order picking carriage 11 display the same color A, B.

Subsequently, at least one optional method step 75 can be carried out, wherein the color of at least one further display area 17, 37 and/or 55 is switched depending on the location.

The various situations in which this can be done, for example, are described above with reference to FIG. 1. Likewise, the uses of the warehouse management system 6 and/or the order picking and warehouse system 1 described above with reference to FIGS. 1 to 4 can be understood as optional process steps.

REFERENCE NUMERALS

1 Order picking and warehouse system
3 Warehouse
5 Storage unit
6 Warehouse management system
7 Order picker
9 Item
11 Order picking trolley
13 Order picking path
15 Information transmitter
17 Display area
19 Wearable
21 Optical signal
23 Acknowledgement transmitter
25 Position transmitter
27 Storage areas
29 Access station
31 Loading and/or removal station
33 Control device
35 Eye-catching transmitter
37 Display area
39 Position detection system
41 Handling unit
43 Picking order
45 Set of picking orders
47 Display device
49 Position transmitter
51 Eye-catching transmitter
53 Eye-catching lamp
55 Display area
57 Order picking zone
59 Access zone
61 Position of an order picker
63 Position of an order picking trolley
65 Zone
67 Arrow
69-75 Procedural steps
77 Computer program product

The invention claimed is:

1. Warehouse management system for controlling order picking comprising:
   at least one order picking trolley for storing items of a set of picking orders;
   at least one storage unit with storage areas for storing the items;
   at least one access station for providing access to the items; and an information transmitter having a display area, the information transmitter configured to be worn on a body of an order picker, wherein the at least one order picking trolley and the at least one access station include remotely switchable eye-catching transmitters configured to display a plurality colors; and wherein the warehouse management system is configured to:
  automatically detect whether at least one item of the items of the set of picking orders in the at least one access station is in an accessible position for the order picker;
  automatically switch a color of a first eye-catching transmitter of the remotely switchable eye-catching transmitters to a color of a second eye-catching transmitter of the remotely switchable eye-catching transmitters in response to detecting that the at least one item is in the accessible position within a predetermined time; and
  automatically set the display area of the information transmitter and a display area of an eye-catching transmitter of the at least one order picking trolley to a same color based on assignment of the at least one order picking trolley to the order picker.

2. The warehouse management system according to claim 1, further comprising a plurality of access stations, including the at least one access station, each having a remotely switchable eye-catching transmitter,
  wherein the warehouse management system is further configured to, in response to determining that the items of the set of picking orders are in the accessible position of particular access stations of the plurality of access stations, automatically switch colors of eye-catching transmitters of the particular access stations to a color of the eye-catching transmitter of the at least one order picking trolley.

3. The warehouse management system according to claim 1 further comprising a plurality of order picking trolleys, including the at least one order picking trolley, each having an eye-catching transmitter with a display area, each display area having a unique color;
  a plurality of access stations, including the at least one access station, each having a remotely switchable eye-catching transmitter with a display area,
  wherein the warehouse management system is further configured to, in response to determining that the items of the set of picking orders are in the accessible position of particular access stations of the plurality of access stations, automatically switch display areas of eye-catching transmitters of the particular access stations to the unique color of the display area of the at least one order picking trolley.

4. The warehouse management system according to claim 1, wherein the warehouse management system is further configured to automatically switch the color of the eye-catching transmitter of an access station, of the at least one access station, after accessing all items of the set of picking orders provided for access from the access station.

5. The warehouse management system according to claim 1, wherein the warehouse management system is further configured to automatically control a plurality of storage units, including the at least one storage unit, such that individual items of the set of picking orders are provided in multiple access stations simultaneously.

6. The warehouse management system according to claim 1, wherein the warehouse management system is further configured to determine a position of the at least one order picking trolley and/or the eye-catching transmitter of the at least one order picking trolley.

7. The warehouse management system according to claim 6, wherein the warehouse management system is further configured to control one or more storage units, including the at least one storage unit, in a predetermined zone around a determined position associated with the at least one order picking trolley such that individual items of the set of picking orders are simultaneously accessible in multiple access stations within the predetermined zone.

8. The warehouse management system according to claim 1, wherein the warehouse management system is further configured to switch a color of one or more of the remotely switchable eye-catching transmitters based on its determined location.

9. The warehouse management system according to claim 1, wherein the warehouse management system is further configured to automatically switch colors of eye-catching transmitters of a plurality of order picking trolleys, including the at least one order picking trolley, to different colors.

10. The warehouse management system according to claim 1, wherein the warehouse management system is further configured to automatically determine a position of the information transmitter and to change the color of the display area of the information transmitter depending on the position.

11. The warehouse management system according to claim 10, wherein the warehouse management system is further configured to automatically change the color of the display area of the information transmitter to a color of a particular eye-catching transmitter of a particular access station of the at least one access station when the information transmitter is in a predetermined position relative to the particular access station.

12. The warehouse management system according to claim 10, wherein the warehouse management system is further configured to determine an access zone in front of the at least one access station via geofencing and to automatically set a color of the display area of the information transmitter to a color of the display area of the eye-catching transmitter of the at least one access station when the information transmitter is located within the access zone.

13. The warehouse management system according to claim 10, wherein the warehouse management system is further configured to reset the color of the display area of the information transmitter from the color of the eye-catching transmitter of the at least one access station to a previously set color when all the items of the set of picking orders stored at the at least one order picking trolley have been taken from the at least one access station, wherein the eye-catching transmitter of the at least one order picking trolley has a same color as the display area of the information transmitter before being reset.

14. The warehouse management system according to claim 1, wherein the warehouse management system is further configured to output an optical signal at the information transmitter, wherein the optical signal is representative of a position of a handling unit on the at least one order picking trolley into which an item, of the items of the set of picking orders, taken from the at least one access station is to be stored and/or a number and/or a type of the items to be stored in the handling unit of the at least one order picking trolley.

15. An order picking system comprising:
  at least one order picking trolley including an eye-catching transmitter having a first colored display area;

at least one storage unit including an eye-catching transmitter having a second colored display area, wherein at least one of the first colored display area and the second colored display area have a color which can be remotely switched to a different color by a warehouse management system; and an information transmitter configured as a wearable device, the information transmitter having a remote-controlled display area with switchable color and being connected in a data-transmitting manner via the warehouse management system to the eye-catching transmitter of the at least one order picking trolley and the eye-catching transmitter of the at least one storage unit.

16. The order picking system according to claim 15, further comprising:
   an access zone determined by the warehouse management system based on geofencing, the access zone accessible to an order picker for accessing at least one access station of the at least one storage unit and arranged in front of the at least one access station; and
   a position transmitter portable by the order picker for determining a position of the order picker relative to the access zone.

17. The order picking system according to claim 15, wherein the warehouse management system is further configured to automatically determine a position of the information transmitter and to change the color of the remote-controlled display area of the information transmitter depending on the position.

18. The order picking system according to claim 15, wherein the warehouse management system is further configured to control one or more storage units, including the at least one storage unit, in a predetermined zone around a determined position associated with the at least one order picking trolley.

19. An order picking method, comprising:
   assigning an order picking trolley to a set of picking orders comprising a plurality of items;
   automatically determining that at least one item of the set of picking orders is accessible by an order picker at an access station of a storage unit;
   wherein the order picking trolley and the access station each have an eye-catching transmitter with a colored display area and a color of each colored display area can be switched remotely;
   automatically switching the color of the colored display area of one of the order picking trolley and the access station to the color of the colored display area of another of the order picking trolley and the access station after determining the at least one item of the set of picking orders is accessible; and
   automatically setting a display area of an information transmitter configured to be worn on a body of the order picker and the colored display area of the eye-catching transmitter of the order picking trolley to a same color based on an assignment of the order picking trolley to the order picker.

20. One or more non-transitory computer readable storage media encoded with software comprising computer executable instructions, and when the software is executed, cause a computer to perform the method of claim 19.

* * * * *